Sept. 5, 1967  B. G. WARD, JR., ET AL  3,339,616
APPARATUS FOR COMBUSTION OF FUELS AND BURNER THEREFOR
Filed June 3, 1965  2 Sheets-Sheet 2

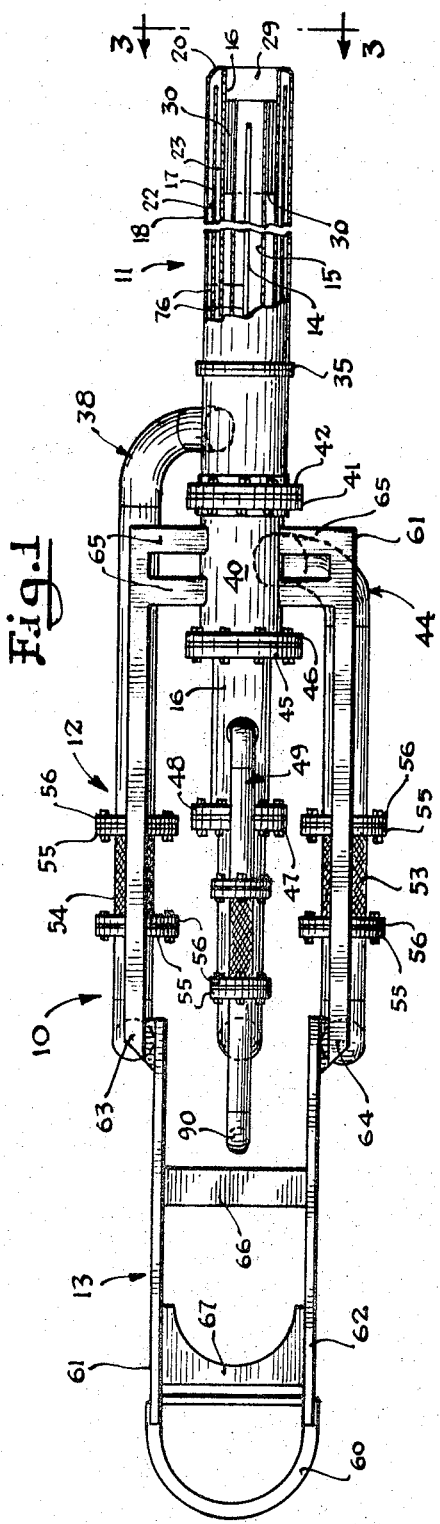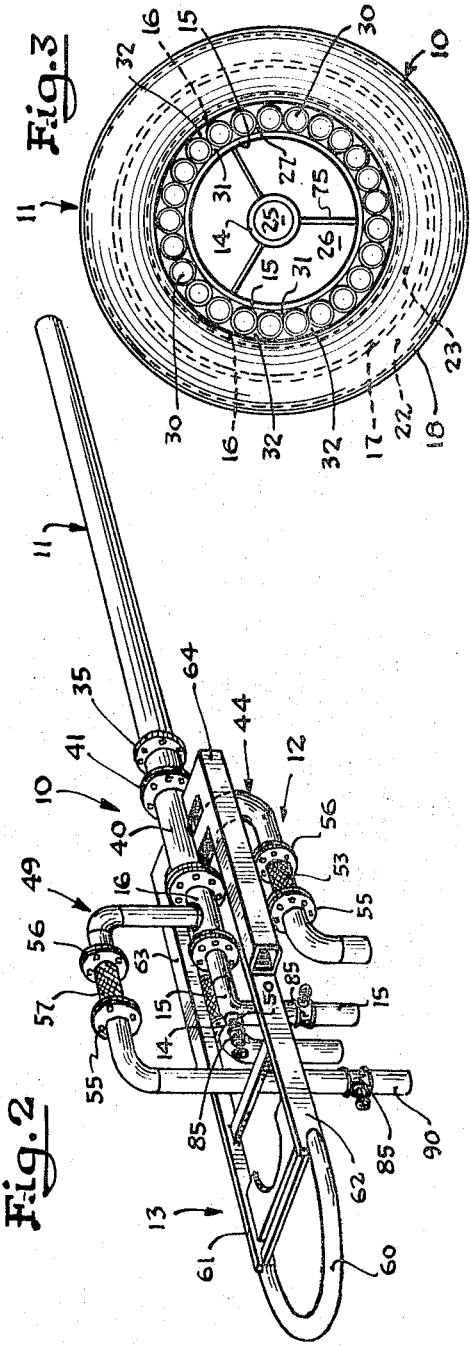

Inventors
Bert G. Ward Jr.
Donald M. Gettig
By /s/ 
Attorney

United States Patent Office 3,339,616
Patented Sept. 5, 1967

3,339,616
APPARATUS FOR COMBUSTION OF FUELS AND BURNER THEREFOR
Bert G. Ward, Jr., Niles, and Donald M. Gettig, Elk Grove Village, Ill., assignors to Chemetron Corporation, Chicago, Ill., a corporation of Delaware
Filed June 3, 1965, Ser. No. 460,985
7 Claims. (Cl. 158—109)

This invention relates in general to an apparatus for burning fluid fuels. More particularly, this invention relates to an apparatus for burning large volumes of gases at high velocities for melting and refining scrap metals while maintaining the noise level of combustion at a minimum.

Burners having a capacity over 25 million B.t.u.'s per hour wherein temperatures over 3000° F. are maintained for substantial periods of time have found wide use in various types of furnaces such as the open hearth, the reverberatory type, the electrical furnace and, relatively recently, the basic oxygen furnace which is being employed to a greater degree because of its fast rate of steel making. To maintain a high degree of steel production in the basic oxygen furnace it is necessary to have a source of heat capable of preheating and melting large volumes of scrap metal, iron ore and other solid, ferrous and non-ferrous bearing scrap materials. Such a burner is disclosed by one of the joint inventors in copending application Ser. No. 240,095 filed Nov. 26, 1962. This burner employs a modified concentric flow stream of fuel and oxidizing gas and not only offers the advantage of high B.t.u. capacity but also has a very low noise level. Concentric type flow stream combustion is also described in U.S. 2,360,548 and burners describing axially aligned streams of fuel and oxidizing gas are also described in U.S. 1,721,381, 2,015,934, and 3,127,156.

While the burner in the previously referred to application has a higher B.t.u. capacity than the referred to prior art burners the burner of the present invention has an even greater capacity. It, like the burner in the copending application but unlike most commercially employed burners using converging or concentric streams of fuel and air, is substantially noiseless even when operating in the confines of a basic oxygen furnace. The commercially available burners are not capable of preheating and melting the large amounts of scrap metal required for profitable operation of the basic oxygen furnace and do so while burning fuel in an efficient manner. Further, many burners of the type concerned with in this invention are of the pre-mix type presenting explosion hazards and requiring close regulation of fuel to air mixtures for operable flame characteristics. Many of the burners employed in steel making processes are complicated in design and costly to manufacture.

It is therefore an object of the present invention to provide an apparatus for burning fluid fuels in large quantities and at high flow rates. It is still a further object of this invention to provide an apparatus for burning fluid fuels in large quantities and at high flow rates with a minimum amount of noise. It is still another object of the present invention to provide an apparatus for burning large quantities of fluid fuels in a highly efficient manner. It is another object of the present invention to provide a burner assembly for preheating and melting scrap materials in a basic oxygen furnace. A still further object of the present invention is to provide a burner assembly for carrying out the herein described process which reduces the hazards of explosions and yet is easily and economically manufactured and repaired. Other objects and advantages of this invention will become more apparent as the following description proceeds when taken in conjunction with the accompanying drawing in which:

FIGURE 1 is a top view of one embodiment of a burner assembly for carrying out the process of the present invention.

FIGURE 2 is a perspective view of the burner assembly of FIGURE 1.

FIGURE 3 is an enlarged end view of FIGURE 1 taken along line 3—3 thereof.

Figure 4:
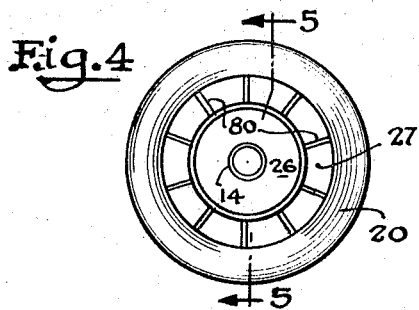
FIGURE 4 is an end view of another embodiment of the present invention.

Basically, the apparatus of the present invention for burning combustible fluid fuels in large volumes with a minimum amount of noise directs a first central circular stream of combustible fluid fuel in a substantially linear manner at a given velocity. Simultaneously, oxidizing gas is concentrically directed in a second stream around the first stream and at a velocity less than that of the first stream. At the same time combustible fluid fuel is directed concentrically around the second stream composed of the oxidizing gas. In a preferred manner, the third stream is directed at a velocity less than that of the second oxidizing stream so that the first stream tends to draw the second stream into it and the second stream in turn aspirates the third stream. While the third stream is so directed, best results are obtained when the third stream is guided in a parallel manner with respect to the second stream and distributed circumferentially and uniformly therearound so that a gradual intermixing is thereby accomplished between the second and third streams. Combustion is most efficiently effected in employing the three stream apparatus of the present invention when the volume of fuel in central fuel stream as compared to the outer or third stream of fuel is in the range of 10–20%. These preferred operating conditions are utilized when natural gas is the combustible fluid fuel and the oxidizing gas is substantially pure oxygen. With the two fuel streams operating under the previously referred to conditions, the volume of the oxygen stream flowing between the two fuel streams should be about twice that of the outer third stream of natural gas.

There are also cross sectional areas of the three streams which give the best results in conjunction with the foregoing concentric flow pattern and volumes. Assuming the cross section of the central stream to have a numerical factor of one, the cross section of the second or oxygen stream should have a numerical amount of about 21 and the third or outer fuel stream a factor of about 16.5. It should be considered that all of the previously described conditions may vary to a degree depending upon the amount of noise to be eliminated and the desired efficiency of combustion. In conjunction with the previously described conditions, and to obtain the desired aspirating effect the central gas stream should have a velocity in the range of about 1000 to 1550 ft./sec., the oxygen stream a velocity of about 700 to 950 ft./sec. and the outer gas stream should be in the range of 400 to 600 ft./sec.

When the novel apparatus of the present invention is employed one can obtain temperatures as high as 5000° F. and most importantly provide at least two hundred million B.t.u.'s per hour. Fifty tons of cold scrap have been heated to approximately 1000° F. in about eight minutes. Indicative of the high B.t.u. capacity of the apparatus herein described are the large volumes of natural gas and oxygen which can be consumed. This is shown in the following Table I wherein actual flow rates of natural gas and oxygen consumed in accordance with this invention are described:

TABLE I

| Run Number | Cu. ft. of Natural Gas Per Hour | Cu. ft. of Oxygen Per Hour | Operating Time (Min.) | Firing Rate B.t.u.'s/hr. In Millions |
|---|---|---|---|---|
| 1 | 140,000 | 212,000 | 5 | 140 |
| 2 | 127,000 | 210,000 | 5 | 127 |
| 3 | 134,120 | 225,000 | 5 | 134 |
| 4 | 44,120 | 90,000 | 5 | 44 |
| 5 | 180,000 | 300,000 | 5 | 180 |
| 6 | 150,000 | 225,000 | 6 | 150 |
| 7 | 150,000 | 225,000 | 6 | 150 |
| 8 | 121,000 | 94,500 | 7 | 121 |
| 9 | 151,900 | 205,000 | 5 | 151 |
| 10 | 150,000 | 240,000 | 5 | 150 |
| 11 | 150,000 | 240,000 | 8 | 150 |

When the large volumes of gas listed in Table I were burned under the conditions previously described and in a standard basic oxygen furnace the noise level was such that combustion was audibly unnoticeable over the normal sounds associated wtih steel mill operations. The flame duration in Table I is shown to be at a maximum of 8 minutes because the melting of the available amount of scrap metal was accomplished in that preiod of time. It can be of unlimited duration if desired or until the desired high temperature is reached in the scrap metal.

From Table I it will be seen that the preferred combustible fluid fuel in the operation of this invention is natural gas and the preferred oxidizing gas is oxygen. However, other fluid fuels whether of the strictly gaseous, liquid, or particulate type can also be employed in conjunction with an oxidizing gas. Representative of the gaseous class are hydrogen or propane; illustrations of the liquid fuels are fuel oil, pitch or tar; and representative of the solid particulate kind is pulverized coal. Mixtures of the foregoing can obviously be employed in the same manner as each of the fuels would be used alone. While substantially pure oxygen is the preferred oxidizing gas for the combustion of the foregoing mentioned fluid fiuels, and mixtures thereof, other gaseous and solid oxidizing materials can also be employed such as air and fluorine, pentoxides, perchlorates or mixtures thereof.

In practicing the present operation it is essential for the oxidizing gas stream to be located between the two fuel streams. This assures complete use of the oxidizing gas and prevents undesired oxidation of the melted metals. While best results have been obtained when the two fuel streams are the same it is possible to employ fuel streams which are different both chemically and physically. For example, the central stream can be fuel oil, the second stream oxygen and the third natural gas.

The drawing illustrates several embodiments of a burner assembly which has been found most effective in carrying out the foregoing operation. All of the embodiments described in FIGURES 1–10 are comprised of five concentric positioned tubular members. The first or central tubular member as well as the second and third tubular members provide chambers for the central fuel stream, the oxidizing gas stream and the outer fuel stream, respectively. The fourth and fifth tubular members cooperate to provide a cooling means when water is circulated therein. Referring specifically to the embodiment shown in FIGURES 1–3, burner assembly generally 10 is comprised of a barrel portion generally 11, a utility section generally 12 and a bale assembly generally 13. As best seen in FIGURE 3, the barrel portion 11 is formed from five concentrically positioned pipes 14, 15, 16, 17 and 18. Outer pipe 18 has a round end portion 20 and is welded in a suitable manner to pipe 16 and around the end pipe 17 with pipe 17 terminating a short distance therefrom. Pipes 17 and 18 provide outer cooling chambers 22 and 23 which are in closed communication by means of rounded portion 20. Central pipe 14 provides a central chamber 25 while chamber 26 is formed between pipes 14 and 15 and similarly another concentric chamber 27 is provided between pipes 15 and 16. Pipe 16 extends a short distance beyond pipe 15 as well as pipe 14 to provide a nozzle portion 29 for the fluid fluel and oxidizing gas which pass outwardly from chambers 25, 26 and 27.

Disposed between pipes 15 and 16 and extending a short distance into nozzle portion 29 are a plurality of copper tubes 30. All of the tubes, as are all of the pipes, are aligned in a parallel manner with the longitudinal axis of the burner. Tubes 30 are abutted against each other around chamber 26 and in chamber 27. These small tubes have their outward ends in transverse alignment and are suitably secured between pipes 15 and 16 by brazing them to the outer surface of pipe 15. Shims can be employed in addition to brazing if desired to effect contact between pipes 30 and the wall surfaces of pipes 15 and 16. The abutment of pipes 30 around the outside surface of pipe 15 provides a multiplicity of small triangular passages 31 immediately adjacent pipe 15 as well as larger triangular passages 32 adjacent pipe 16.

Referring to the barrel portion 11 of burner assembly 10, flange 35 extends circumferentially around outer pipe 18 and is welded thereto. The sole function of flange 35 is to provide an abutment surface for barrel portion 11 when burner 10 is lowered into a furnace. A water outlet line generally 38 communicates with chamber 22 through pipe 18 near the connection of pipe 18 with collar 40. This is accomplished by flanges 41 and 42 welded to the respective pipe 18 and collar 40 and bolted together. Water inlet line 44 communicates through collar 40 and with chamber 23. In the present instance, collar 40 has the same outside and inside diameters as pipe 18 whereby a large chamber is formed for the water to enter prior to its entry into chamber 23 in nozzle portion 11. A sealing means (not shown) blocks the passage of water into chamber 22. Collar 40 is sealed to pipe 16 and spaced therefrom by means of combined stuffing box and flanges 45 and 46 which like flanges 41 and 42, and all of the flanges employed in burner assembly 10 with the exception of flange 35 are secured by bolts. Similarly, a combined stuffing box and flanges 47–48 serve to space and seal pipe 16 to pipe 15. Between flanges 47–48 and 45–46 a fluid fuel line generally 49 enters through pipe 16 and into communication with chamber 27. Central pipe 14 emerges concentrically from pipe 15 and is positioned therein by means of a common packing nut 50 which provides a fluid type seal.

Water inlet line 44 which brings cold water to nozzle portion 16 and water outlet line 38 which carried heated water away have in-line expansion sections 53 and 54, respectively, which are of the stainless steel, corrugated flexible tubing type and connected in the lines by two pairs of flanges 55–56. A similar expansion section 57 is disposed in fuel inlet line 49.

Bale assembly generally 13 is composed of substantially U-shaped hook portion 60 welded to two laterally extending plates 61 and 62 which in turn are interconnected with laterally disposed beams 63 and 64, respectively. Paired lengths of steel tubing 65 interconnect plates 63 and 64 as by welding with collar 40. Suitable bracing members 66 and 67 are disposed between beams 63 and 64 beyond the back of the burner and are also secured by welding.

As previously indicated, the relative diameters of the pipe comprising burner assembly 10 as well as the assemblies 70, 71, 72 and 73 shown in FIGURES 4–10 are major factors in carrying out the herein described operation. As all of the corresponding pipes in assemblies 70–73 are the same and are of the same size they are numbered the same. This is also true of the chambers thereby formed. Central fuel pipe 14 is a three-quarter inch stainless pipe, Schedule 5. It is 48 feet, eight and one-half inches in length and extends substantially the entire length of the utility and nozzle portions of the burner assembly. Oxidizing gas carrying pipe 15 is also made of stainless steel and is 47 feet, one-half inch long while pipe 16 is fabricated from seamless tubing having an outside diameter of six and one-quarter inches and is 45 feet, four inches long. Likewise, pipe 17 is also seamless tubing having a seven and one-half inch outside diameter and is 42 feet, nine inches long. Pipe 18 is eight and five-eighths inches in outside diameter, Schedule 30, measuring 42 feet, three inches in length and similarly collar 40 has the same diameter, and schedule as pipe 18 but is only sixteen inches long. Tubes 30 are three-quarter inch seamless copper tubing having an outside diameter of three-quarter inch and an inside diameter of 0.686 inch with a wall thickness of 0.032 inch. They are 12 inches in length and in addition to having a directional effect on the gas in chamber 27 also serve to space pipe 15 from pipe 16. Spacing elements 75 also separate pipe 14 from pipe 15 and spacers such as shown at 76 also maintain the pipes in concentric alignment.

Figure 5:
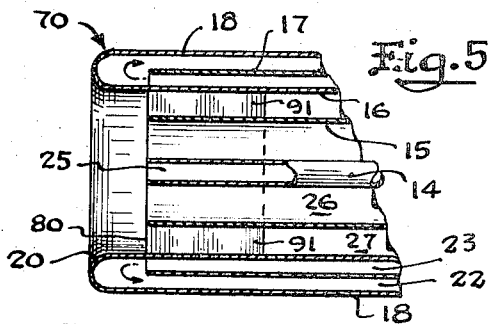
FIGURE 5 is a view in vertical section taken along line 5—5 of FIGURE 4.
Figure 6:
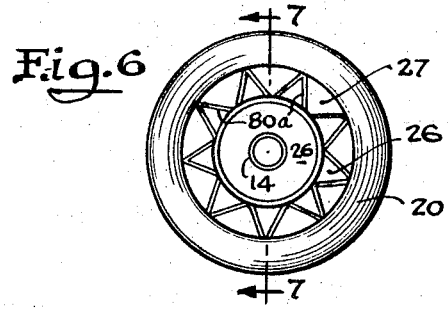
FIGURE 6 is a view like FIGURE 4 of still another embodiment.
Figure 7:
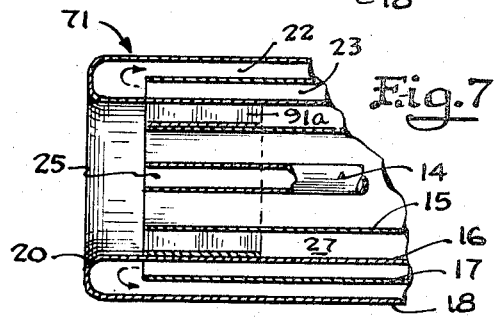
FIGURE 7 is a view in vertical section taken along line 7—7 of FIGURE 6.
Figure 8:
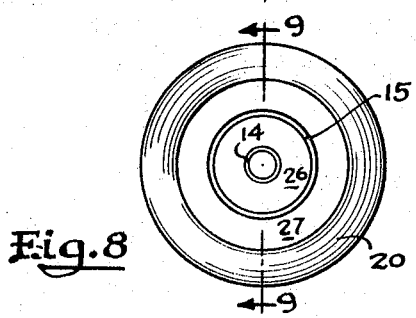
FIGURE 8 is an end view of an alternative embodiment somewhat similar to the device of FIGURE 3 but with the small tubular members removed.
Figure 9:
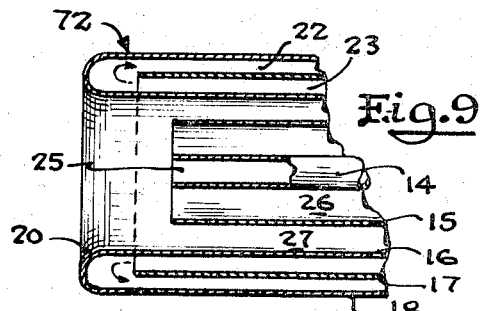
FIGURE 9 is a view in vertical section taken along line 9—9 of FIGURE 8.
Figure 10:
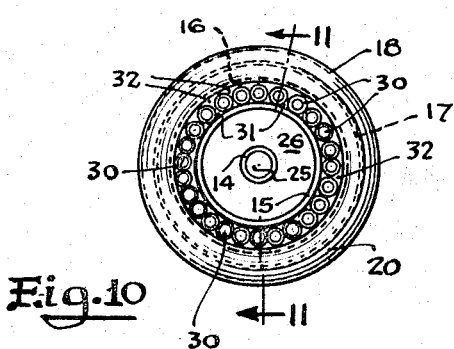
FIGURE 10 is an end view of another embodiment similar to the device of FIGURE 3 but with the central chamber terminating in transverse alignment with the second and third chambers.
Figure 11:
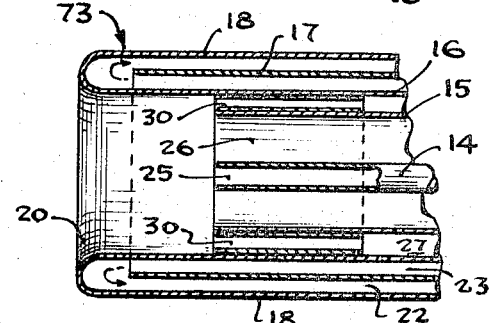
FIGURE 11 is a view in vertical section taken along line 11—11 of FIGURE 10.

In the particular embodiment shown in FIGURES 4–5 the tubes 30 of burner assemblies 10 and 73 are replaced in chamber 27 with radially disposed partition members 80 such as 20 gage by three-quarter inch wide by twelve inches long sheet stock while in the embodiment illustrated in FIGURE 6 partition members 80a similar to 80 are placed in a star-like pattern concentrically around chamber 26 and in chamber 27. As disclosed earlier with reference to the brazing of tubes 30 between pipes 15 and 16, partitions 80 are also secured in chamber 27 by brazing to the contacting surfaces of pipe 15 and 16. FIGURES 8 and 9 show an alternative embodiment wherein no tubular or partition members are present in chamber 27 and central fuel pipe 14 terminates in transverse alignment with pipe 15. In the embodiment of FIGURES 10 and 11 tubes 30 are employed in chamber 27 and as in the embodiment of FIGURE 8 the end of central fuel pipe 14 terminates with the end of pipe 15.

A clearer understanding of the novel apparatus of the present invention can be had through an explanation of the operation of the novel burner assembly. Pipe 15 is connected to a suitable supply of oxygen which also has a means for regulating and measuring the flow of oxygen to chamber 26 such as a valve 85. In a similar manner, gas inlet line 49 by means of section 90 is connected to a relatively low pressure source of natural gas while that portion of pipe 14 extending from the rear of the burner is ultimately connected to a relatively high pressure source of natural gas, all connections for this high and low pressure natural gas being made in conjunction with regulatory and metering means generally indicated by valves 85. As the aforegoing mentioned regulatory and metering mechanisms are of the standard type, they are only generally shown in the drawing. With cool water flowing into chamber 23, oxygen is introduced into chamber 26 at a flow rate of about 50,000 cubic feet per hour. Natural gas is subsequently metered into chamber 25 at a flow rate of about 25,000 c.f.h. at a pressure of 240 p.s.i.g. and the natural gas ignited. The flow rate of oxygen in chamber 26 is increased to 300,000 c.f.h. while natural gas is introduced into chamber 27 at a flow rate of 150,000 c.f.h. with a pressure of 130 p.s.i.g. Under these conditions and when operating all of the embodiments of the present invention, the natural gas emanating from pipe 14 will have the faster velocity and will be about 1500 ft./sec.; oxygen emerging from chamber 26 will have a velocity of about 690 ft./sec. and the velocity of the natural gas flowing from chamber 27 will be about 460 ft./sec.

The longitudinal configuration of chambers 25, 26 and 27 as well as their parallel relationship with respect to each other will impart to the oxygen and natural gas streams a parallel and coaxial flow pattern. An expansion of the gases takes place immediately in front of the burner and gives the characteristic flame-like pattern. With the central gas stream having a faster velocity than either the surrounding oxygen stream or the outside gas stream, the central gas stream will tend to draw the oxygen stream into it and the oxygen stream will in turn aspirate the outside natural gas stream into the oxygen stream. The foregoing aspirating effect in the three streams of gas and oxygen are typical of the operation of the burner design of FIGURES 8 and 9 which have no gas directing and distributing means such as tubes 30 or partitions 80 in gas chamber 27. Capacities of as high as two hundred million per hour or in excess if burner dimensions allow, can be reached without such means and at a low noise level.

The burner design which gives the best results from the standpoint of noise elimination and the hottest flame is the embodiment shown in FIGURES 10 and 11 when the previously described lighting sequence and flow rates are employed. When the burner designs of FIGURES 1–6 and, as previously indicated the design of FIGURES 10–11, are employed the same operational procedures are utilized regarding flow rates, velocity and pressures as well as lighting sequence, but an additional effect is produced on the outside gas stream passing through and from chamber 27. In the instance of the burner in FIGURES 1–3 and 10–11 the aspirating effect of the oxygen stream on the gas is somewhat delayed by the gas passing through tubular members 30. The gas emerging from between the triangular portions 31 near chamber 26 will be in closer contact with the oxygen stream than the gas emerging through and from tubes 30. The natural gas passing along the inside portion of tubes 30 most adjacent to the exterior wall surface of pipe 15 is farther removed from the outermost surface of the oxygen stream than the natural gas passing along the immediate exterior wall of pipe 15. This difference of course, is the thickness of the wall tube 30 which is only about 0.032 of an inch. However, this difference is sufficient to prevent an immediate intermixing of all portions of the gases until they are a considerable distance from the burner. It will be seen that the natural gas passing through the triangular portions 31 adjacent to pipe 15 are drawn into the oxygen stream first, then gas passing through those portions of tubes 30 most adjacent to pipe 15, and finally the gas from the more remote areas of tubes 30 and the relatively larger triangular sections 32 adjacent pipe 16. This in effect causes a uniformly circumferential separation of portions of the gas from the oxygen stream at greater distances along the flow path of the oxygen stream. At the same time tubes 30 provide a distribution and direction or straightening means for the gas passing through chamber 27. The gradual distributing and mixing effect is caused by tubes 30 effecting a faster velocity for circumferential portions of the gas stream as it passes through and around tubes 30. By having tubes 30 impart a linear and parallel direction to the natural gas stream as well as evenly and uniformly distribute the natural gas around the oxygen stream, the flame has a smooth firing effect and is not as erratic as when parallel concentric pipes are employed alone. The smooth firing of course, also aids in reducing the noise of combustion.

The partitions 80 and 80a of the burner design of FIGURES 4–7 also serve to impart a distributing effect to the gas emerging from chamber 27 and do so at relatively low velocities of the gas stream. This is caused by the gas impinging along the back edges of the partitions such as shown in 91 and 91a whereby a pressure drop with increased velocity is caused. It will be noted that the partitions 80 while imparting a distributive effect serve to direct the gas along a parallel axis with respect to the oxygen stream and the central gas stream. The star-like pattern of partitions 80 as disclosed in FIGURE 6 as is true of tubes 30, but unlike the partitions in the burner of FIGURE 4, uniformly and circumferentially separate portions of the gas stream from the oxidizing gas stream while directing it in a parallel manner.

It will be noted that tubes 30 and partitions 80 are disposed in chamber 27 only. If desired, these distributing, separating and directing means can be also placed in chamber 26 to provide the same effects for the oxidizing gas in relation to the central gas stream as previously described with respect to the fuel as it issues from chamber 27 with respect to the oxidizing gas issuing from chamber 26. While noise can be reduced and large volumes of gas burned with a high degree of efficiency without tubes 30 or partitions 80 the directing and distributive means such as tubes 30 and partitions 80 do aid measurably in reducing noise. Any number of tubes or partitions can be spaced equidistantly around chamber 27 with the provision that the required area for the passage of gas is available and the pressure drop is not too greatly increased. Further, it is not essential that center pipe 14 be of a circular configuration. As it delivers a relatively smaller proportion of the total amount of fuel it can be of square or rectangular configuration and the method of this invention still be practiced.

With the natural gas and oxygen streams emerging from all of the burners of the present invention under the conditions herein described, a flame of about 12–16 feet in length is produced which is caused by the gradual intermixing of the gaseous streams over the designated 12–16 foot area. The pressure caused by the ignition of the gas stream issuing from chamber 27 will also aid in forcing it into the oxygen stream. Even though the burner is operated inside a confined area such as a basic oxygen furnace the noise is so minimal that it is not obvious under the customary mill operations.

From the foregoing description of the present process and burner it is apparent that there is now provided an apparatus for the combustion of fluid fuels to effect high temperatures and with high B.t.u. capacities which prior to this invention was not possible when employing oxygen. These desirable effects are accomplished with a minimum amount of noise of combustion. The apparatus is simple and inexpensive to make as is appreciated by the relative simplicity of the burner design which is economical to manufacture as it can be fabricated without requiring special tools or materials and can be readily adapted to most existing steel mill facilities. In addition, the burner has a minimum number of parts to maintain. The burner of the present invention is designed to be easily inserted into and retracted from a basic oxygen furnace and can reach any areas within the furnace.

It will be apparent that certain modifications and changes will be necessary for adaptation to specific materials from time to time as will be suggested to those skilled in the art. It is intended that all such modifications and changes as come within the spirit of this invention are intended as being within its scope as best defined by the appended claims wherein there is claimed.

We claim:
1. An apparatus for burning large volumes of combustible fluid fuels with minimum noise comprising a first central chamber, second and third chambers substantially coaxially aligned with said first chamber, combustible fuel inlet means communicating with said first and third chambers, oxidizing gas inlet means communicating with said second chamber, all of said inlet means communicating with said chambers at one end thereof, said chambers opening away from said inlet means to define a nozzle portion for delivering fluid fuel and gas streams from all of said chambers in a substantially coaxial manner outwardly from said apparatus, a plurality of tubular members disposed in said third chamber in longitudinal alignment with said chambers and cooling means in heat exchange relationship with said nozzle portion to cool same.

2. The apparatus as defined in claim 1 wherein said tubular members are abutted against one another completely around a wall of said second chamber.

3. The apparatus as defined in claim 2 wherein all of said tubular members have substantially the same inside and outside diameters.

4. An apparatus for burning large volumes of combustible fluid fuels with minimum noise comprising a first central chamber, second and third chambers substantially concentric to said first chamber, combustible fuel inlet means communicating with said first and third chambers, oxidizing gas inlet means communicating with said second chamber, all of said inlet means communicating with said chambers at one end thereof, said chambers opening away from said inlet means to define a nozzle portion for delivering fluid fuel and the gas streams from all of said chambers in a substantially concentric manner outwardly from said apparatus, a plurality of partitions in said third chamber to uniformly distribute and direct in a circumferential manner the fuel in the third chamber about the oxidizing gas in the second stream and cooling means in heat exchange relationship with the nozzle portion to cool same.

5. The apparatus for burning large volumes of combustible fluid fuels with minimum noise comprising a first central chamber, second and third chambers substantially concentric to said first chamber, combustible fluid fuel inlet means communicating with said first and third chambers, oxidizing gas inlet means communicating with said second chamber, all of said inlet means communicating with said chambers at one end thereof, said chambers opening away from said inlet means to define a nozzle portion for delivering fluid fuel and gas streams from all said chambers in a substantially concentric manner outwardly from said apparatus, a plurality of partitions in said third chamber formed in a star-like pattern around said second chamber and cooling means in heat exchange relationship with said nozzle portion to cool same.

6. An apparatus for burning large volumes of combustible fluid fuel with minimum noise comprising a first tubular member forming a central passage, second and third tubular members forming passages substantially coaxially aligned with said first passage, combustible fluid fuel and oxidizing gas inlet means communicating independently with said first, second and third passages, said passages opening away from said inlet means in a nozzle portion for delivering independently fluid fuel and gas streams from said passages in a substantially coaxial manner outwardly from said apparatus, a multiplicity of wall members spanning the nozzle portion of said burner in said third passage to direct in a circumferential manner and substantially completely around said second passage the stream in said third passage while evenly distributing said stream from said third passage and permitting its entrainment by means of the faster fluid flow in said second passage and cooling means in heat exchange reltaionship with said nozzle portion to cool same.

7. The apparatus as defined in claim 6 further including means to flow the combustible fuel through said first passage at a first given velocity, means to flow the oxidizing gas through said second passage at a second velocity slower than said first velocity and means to flow said combustible fuel through said third passage at a velocity slower than said second velocity.

References Cited

UNITED STATES PATENTS

| | | | |
|---|---|---|---|
| 2,331,989 | 10/1943 | Luellen | 158—73 |
| 2,598,787 | 6/1952 | Haak | 158—110 X |
| 2,633,908 | 4/1953 | Brierly | 239—558 X |
| 3,127,156 | 3/1964 | Shepherd | 263—43 |
| 3,202,201 | 8/1965 | Masella et al. | 158—109 |
| 3,236,281 | 2/1966 | Bain et al. | 158—11 |

JAMES W. WESTHAVER, *Primary Examiner.*